United States Patent
Taylor, Jr. et al.

[11] Patent Number: 6,103,206
[45] Date of Patent: Aug. 15, 2000

[54] VERY LOW SULFUR GAS FEEDS FOR SULFUR SENSITIVE SYNGAS AND HYDROCARBON SYNTHESIS PROCESSES

[75] Inventors: James H. Taylor, Jr.; James P. Glass, Jr.; Geoffrey R. Say; Richard P. O'Connor, all of Baton Rouge, La.

[73] Assignee: Exxon Research and Engineering Co, Florham Park, N.J.

[21] Appl. No.: 09/187,884

[22] Filed: Nov. 6, 1998

Related U.S. Application Data

[62] Division of application No. 09/012,534, Jan. 23, 1998, Pat. No. 5,882,614.

[51] Int. Cl.[7] .......................... B01D 47/00; C01B 17/16; C07C 1/02; C07C 27/00; C07C 27/06; B01J 8/00
[52] U.S. Cl. .......................... 423/210; 423/220; 423/230; 252/373; 518/700; 518/722; 48/127.9
[58] Field of Search .......................... 252/373; 423/220, 423/230, 210; 518/700, 702, 722; 48/127.9; 208/91

[56] References Cited

U.S. PATENT DOCUMENTS

| | | | |
|---|---|---|---|
| 3,441,370 | 4/1969 | Gutmann et al. | 23/2 |
| 4,446,005 | 5/1984 | Eberly, Jr. et al. | 208/91 |
| 4,888,131 | 12/1989 | Goetsch et al. | 252/373 |
| 5,114,689 | 5/1992 | Nagji et al. | 423/230 |
| 5,179,129 | 1/1993 | Studer | 518/700 |
| 5,244,641 | 9/1993 | Khare | 423/220 |
| 5,449,696 | 9/1995 | Dandekar et al. | 518/706 |
| 5,769,909 | 6/1998 | Bonk et al. | 48/127.9 |

FOREIGN PATENT DOCUMENTS

| | | | |
|---|---|---|---|
| 0527000 | 2/1993 | European Pat. Off. | C10G 25/00 |
| 1192739 | 5/1970 | United Kingdom . | |

*Primary Examiner*—Steven P. Griffin
*Assistant Examiner*—Eileen E. Nave
*Attorney, Agent, or Firm*—Jay Simon

[57] ABSTRACT

Very low sulfur content hydrocarbon gas is achieved by sequentially contacting the gas first with zinc oxide and then with nickel metal. This has reduced the total sulfur content of natural gas feed for a fluid bed syngas generator to less than 0.1 ppm and has resulted in greater syngas productivity. A zinc oxide guard bed downstream of the syngas generator reduces the total sulfur content of the syngas to less than 10 vppb and preferably less than 5 vppb. This very low sulfur content syngas is used for sulfur sensitive processes, such as hydrocarbon synthesis. The process is especially useful for natural gas which contains $H_2S$, COS, mercaptans and other sulfur bearing compounds.

22 Claims, 2 Drawing Sheets

VERY LOW SULFUR GAS FEEDS FOR SULFUR SENSITIVE SYNGAS AND HYDROCARBON SYNTHESIS PROCESSES

This is a division, of application Ser. No. 012,534 filed Jan. 23, 1998, now U.S. Pat. No. 5,882,614, published Mar. 16, 1999.

BACKGROUND OF THE DISCLOSURE

1. Field of the Invention

The invention relates to sulfur removal from gas feeds for sulfur sensitive syngas generation and hydrocarbon synthesis. More particularly, the invention relates to producing a very low sulfur gas feed for syngas generation, by sequentially contacting the feed with zinc oxide and then nickel to reduce the sulfur content to less than 0.1 vppm and preferably less than 80 vppb. Contacting the syngas with zinc oxide downstream of the syngas generator reduces the total sulfur in the syngas to the less than 10 vppb which is needed for hydrocarbon synthesis.

2. Background of the Invention

Catalytic processes which employ a highly sulfur sensitive catalyst are well known and include, for example, (i) catalytic steam reforming and synthesis gas (syngas) generation in which a light hydrocarbon gas feed is steam reformed in the presence of a steam reforming catalyst and (ii) hydrocarbon synthesis in which a syngas mixture of $H_2$ and CO is reacted to form liquid hydrocarbons in the presence of a suitable Fischer-Tropsch catalyst. Such catalysts include, for example, one or more supported Group VIII catalytic metal components, with nickel being preferred for steam reforming due to it's low cost compared to noble metals and cobalt for some hydrocarbon synthesis (HCS) processes. These catalysts are sensitive to sulfur poisoning which can cause rapid loss of production and require frequent catalyst addition and replacement. Certain HCS catalysts are highly sensitive to sulfur poisoning. Other process which employ a sulfur sensitive catalyst include water gas shift and hydroisomerization. Steam reforming converts a gas mixture of a light hydrocarbon and steam to a mixture of $H_2$ and CO, and some unreacted $CH_4$. It is also used in syngas processes which form a syngas comprising a mixture of $H_2$ and CO as an HCS feed, as a reducing gas and as a source of hydrogen. Syngas processes include catalytic and non-catalytic partial oxidation, steam reforming and a combination of partial oxidation and steam reforming. In the latter case, a feed comprising a mixture of a hydrocarbon, preferably light alkane (e.g., $C_1$–$C_4$) and more preferably primarily methane, as in natural gas, along with oxygen, and steam are fed into a syngas generator (reactor) in which the alkane is partially oxidized and catalytically steam reformed in the presence of a supported nickel or noble metal catalyst. The catalyst can be in either a fixed or a fluidized bed, with the latter known for its excellent mixing and heat transfer characteristics. The fixed bed process is known as an autothermal process and the fluid bed syngas generating (FBSG) process is well known and is disclosed, for example, in the literature and in U.S. Pat. Nos. 4,888,131 and 5,160,456. Sulfur in the hydrocarbon feed deactivates the steam reforming catalyst, thereby reducing productivity and requiring frequent additions of fresh catalyst. This is much more pronounced in FBSG than in a fixed bed syngas process. Sulfur removal using zinc oxide and zinc oxide mixed with nickel or nickel oxide for reducing the sulfur content of a gas is known and disclosed, for example, in U.S. Pat. Nos. 3,441,370 and 5,244,641. U.S. Pat. No. 5,114,689 discloses sulfur removal employing a sequence of a regenerable molecular sieve physical adsorbent, followed by a zinc oxide chemical absorbent, to produce a gas containing from 1–10 vppm sulfur, with about 5 vppm the actual target. However, it has recently been found that as little as 0.1 vppm of sulfur in the feed gas to a FBSG results is loss of catalytic activity. Further, it is desired to reduce the total sulfur in syngas feed to an HCS reactor to less than 10 vppb. Consequently, there is a need for a sulfur removal process which will reduce the sulfur level in the syngas feed to less than 0.1 vppm and to less than 10 vppb in the syngas.

SUMMARY OF THE INVENTION

The invention relates to a process for reducing the sulfur content of a gaseous hydrocarbon and particularly a hydrocarbon feed for a synthesis gas (syngas) generating unit to less than 0.1 vppm (volume parts per million) and preferably less than 80 vppb (volume parts per billion), reducing the sulfur content of the syngas produced from the sulfur reduced hydrocarbon feed to less than 10 vppb and to the use of the sulfur reduced syngas as feed for sulfur sensitive processes, such as hydrocarbon synthesis (HCS), chemical synthesis and any other sulfur sensitive process. In its broadest embodiment, the process of the invention comprises sequentially contacting a sulfur containing gas with two different solid chemisorbents (absorbents), with the first comprising zinc oxide and the second comprising nickel, to produce a sulfur reduced gas. Such contacting is easily accomplished by passing the gas through a first absorption zone comprising particulate zinc oxide and then through a second absorption zone comprising particulate nickel, to produce a sulfur reduced gas containing less than 0.1 vppm of total sulfur. Relative to other processes, this process is particularly effective with gas containing COS (carbonyl sulfide). By sulfur is meant the total amount of sulfur present in the gas and includes sulfur containing compounds such as $H_2S$, COS, RSH and the like, measured as elemental sulfur. Thus, by 0.1 vppm is meant 0.1 vppm of elemental sulfur contained in the sulfur containing compounds. The sulfur compounds react with the zinc oxide and nickel to produce zinc sulfide and nickel sulfide. The nickel is preferably nickel metal and in a particularly preferred embodiment the nickel is supported on a suitable support material. It is preferred that the absorption take place at elevated temperature, with the zinc oxide at a temperature ranging from about 150° F. to 600° F. and the nickel from about 200° F. to 600° F. Reducing the sulfur content of natural gas fed into an FBSG unit down to less than 0.1 vppm and preferably less than 80 vppb according to the practice of the invention, substantially reduces catalyst deactivation in a fluid bed syngas generator (FBSG) and increases the syngas productivity. This invention has been demonstrated with a FBSG using a nickel reforming catalyst, with the sulfur level in the natural gas fed into the FBSG reduced to less than 80 vppb which resulted in less than a 1% per day catalyst activity loss. Thus, a more specific embodiment relates to an integrated process in which the sulfur content of the hydrocarbon, preferably an alkane and still more preferably methane as in natural gas, fed into the FBSG is reduced to less than 0.1 vppm and preferably less than 80 vppb, unit along with steam and oxygen, in which the alkane is partially oxidized and steam reformed to produce a syngas comprising a mixture of $H_2$ and CO. In another and yet further embodiment, the so-produced syngas is contacted with zinc oxide which reduces the sulfur content of the syngas to less than 10 vppb and preferably less than 5 vppb. This very low sulfur syngas may then be used as feed for a sulfur sensitive process as mentioned above, including HCS. In the HCS reactor, the syngas reacts in the presence of a suitable catalyst at conditions effective to produce hydrocarbons with little or no deactivation of the HCS catalyst due to sulfur poisoning. Hydrocarbon synthesis catalysts, such as a catalyst comprising a supported cobalt catalytic component, are particularly sensitive to sulfur deactivation and this deactivation is not reversible. At least a portion of the synthesized hydrocarbons are upgraded by one or more conversion operations to more valuable product. Finally, while there is really no theoretical upper limit to the sulfur content of the gas to be reduced in sulfur by the process of the invention, as a practical matter it is preferred that the total sulfur content of the gas to be treated be less than about 10 vppm and preferably less than 5 vppm. Thus, the sulfur content of the gas to be sequentially contacted with the two absorbents will typically be within the range of from about 1–5 vppm, although it can be less than 1 vppm.

DETAILED DESCRIPTION

Figure 1:
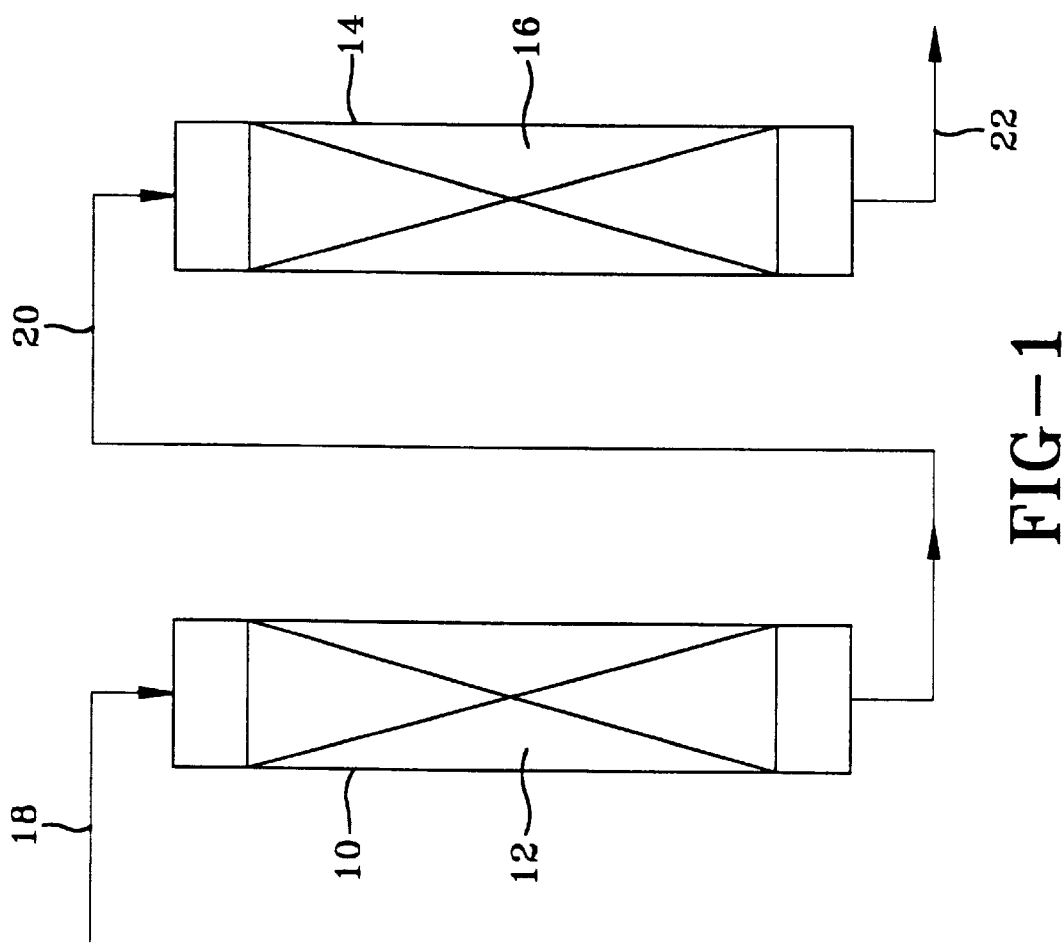
FIG. 1 is a schematic block flow diagram of a sulfur removal process of the invention.

Both the zinc oxide and nickel are solid and when used in guard beds which serve as absorption zones, are preferably particulate so that the absorption beds are porous to permit passage of the gas therethrough. The zinc oxide may be composited with other materials for strength and integrity as in known in the art. While the nickel may be in the form of particulate bulk metal, it is preferred that it be supported on a suitable, inert support material, such as alumina. It is also preferred that both the zinc oxide and the nickel absorption zones operate at an elevated temperature above 150° F. The zinc oxide is typically used at a temperature from about 200–700° F., with the nickel used at a temperature of from about 200° F. to 600° F. and preferably from 300–500° F. While other absorbents may be in each of the zinc oxide and nickel absorbent beds, better results are achieved if each bed comprises primarily or solely the respective zinc oxide and nickel absorbent. It has been found that with the use of zinc oxide alone, with a mixture of zinc oxide and nickel or with nickel upstream of the zinc oxide absorbent, the sulfur content of the gas is higher than the low sulfur levels achieved with the use of a zinc oxide absorbent upstream of a nickel absorbent according to the process of the invention. While not wishing to be held to any particular theory, it is believed that the superiority of the process of the invention is due to the discovery of different selectivity's and absorption capacities of zinc oxide and nickel for different sulfur species. It has been found that zinc oxide is effective in removing $H_2S$, but not COS and perhaps other sulfur bearing compounds. It has further been found that nickel is effective in removing COS and higher (e.g., $C_{2+}$) mercaptans to the very low levels of the invention, but loses this selectivity and capacity when it is contacted with $H_2S$. It is therefore believed that this may be the reason for the superior sulfur removal exhibited by the practice of the invention. It is possible for the absorbent combinations mentioned above which are not the one of the invention to reduce the $H_2S$ level in a gas down to below 10 vppb, but they will not achieve total sulfur reduction of a gas which contains COS and other sulfur bearing compounds for which the zinc oxide has less selectivity and/or capacity to absorb, to below about 1 vppm, and are therefore unacceptable.

Thus, in the practice of the invention, the first absorbent, which is the zinc oxide, removes substantially all of the $H_2S$ from the gas, with the sulfur reduced gas then passed through a bed of the particulate nickel which removes the COS and other sulfur bearing compounds for which the nickel has greater selectivity and/or absorption capacity, to produce a gas, such as natural gas, having a sulfur content below 1 vppm and preferably below 80 vppb. It is mentioned above that by 0.1 vpp sulfur, etc., is meant 0.1 vppm of elemental sulfur. For sulfiur bearing compounds which contain only one atom of sulfur per molecule, such as $H_2S$, single carbon atom mercaptans and COS, this is the same as the vppb of the total concentration of such compounds. The sulfur absorption removal process of the invention is typically used as what is known in the art as a guard bed process, which follows bulk sulfur removal from the gas, as it is obvious that the lower the sulfur content of the gas fed through the two absorption zones, the more efficient will be sulfur removal down to the very low levels achieved with the process of the invention, as well as much longer life of the absorption materials in the beds. In the further embodiment in which the syngas is contacted with zinc oxide, the total sulfur level remaining in the syngas has been found to be below 10 vppb and even below the capability of present analytical methods (e.g., less than 5 and even 3 vppb). This is therefore a very low sulfur syngas which is an excellent feed for sulfur sensitive processes, such as HCS, mentioned above.

Syngas generating processes, including the fluid bed syngas generating process or FBSG which employs both partial oxidation and steam reforming, are well known as disclosed above. The fluid bed or FBSG process is more sulftir sensitive than the fixed bed processes. This is because in a fixed bed process the sulfur is adsorbed on the steam reforming catalyst in the hydrocarbon gas inlet section of the bed, which acts as a guard bed for the rest of the catalyst in the bed. However, in a fluid bed in which the catalyst circulates and mixes throughout the bed, all of the catalyst particles are quickly contaminated and lose activity by contact with sulfur in the gas feed. The sulfur removal process of the invention is also useful with a combination of fluid bed and fixed bed syngas processes in which a fixed bed of catalyst is placed downstream of the fluid bed as disclosed in U.S. Pat. No. 5,421,840. The conditions in an FBSG include pressures in the range of about 10–50 atmospheres, preferably 10–40 atmospheres and more preferably 20–40 atmospheres, while the temperature will range to within about 50° F. of the softening point of the, essentially non-catalytic, heat carrying particles, preferably from about 1650° F. to about 2000° F. and more preferably from about 1700° F. to about 1800° F. The practical upper limits of temperature and pressure are determined by the ability of the catalyst, reactor and heat transfer particles to withstand the higher temperatures and pressures. The catalyst may be any conventional steam-reforming catalyst, or autothermal reforming catalyst. Such catalysts can be described as including one or more catalytic metal components of metal selected from Group VII and Group VIII (Sargent-Welch Periodic Table of the Elements, © 1968) supported on an attrition resistant refractory support, such as a pure alpha alumina. Group VIII metals are preferred and the invention is useful with both noble and non-noble metals of the Group VIII metals. Nickel is preferred due to its low cost, resistance to sulfur poisoning and catalytic effectiveness for the syngas generation. Such catalysts are well known and references to their preparation and composition may be found in the '131 and '456 patents referred to above, in the literature, and also in U.S. Pat. No. 5,395,406. In the fluid bed, the supported steam reforming catalyst is typically mixed with an inert, attrition resistant, particulate refractory to improve heat transfer and to conserve the catalytic metal component. This is known and disclosed in the '131 and '456 patents and in U.S. Pat. No. 5,395,813. While the nickel loading on a catalyst particle will range from between about 1 to 20 wt. %, when the fluidized bed also contains the inert heat transfer particles, the nickel loading in the bed will typically range from about 0.02 to 3 wt. % of the total weight of the particles constituting the bed. The hydrocarbon feed to the FBSG is typically a $C_1$–$C_4$ alkane which may contain trace amounts of $C_5$–$C_8$ alkanes and unsaturates, and preferably methane as in natural gas. Such feed gas will also likely contain up to about 10% ethane and up to about 3% propane. Typical feeds will also contain some $CO_2$ and nitrogen as well as some CO, $H_2$, olefins and oxygenates from downstream recycle operations, such as an HCS process. Preferred feeds comprise mostly methane at a concentration of at least about 70%, preferably 80% and more preferably 90% methane based on the total carbon content of the feed. Natural gas is a feed of choice in many cases. The composition of natural gas varies widely, but includes $N_2$, $CO_2$ and sulfur compounds such as $H_2S$, mercaptans, COS and other organic sulfur bearing compounds. Natural gas from the well can contain up to several percent of sulfur, most of which is $H_2S$. Therefore, it is preferred in the practice of the invention to remove least a portion by known methods (such as amine scrubbing, molecular sieves and combination thereof) prior to the gas being fed into an FBSG. In the practice of the invention it is preferred to use known methods to reduce the sulfur down to a level of preferably less than 10 vppm, before the gas is contacted with the absorbents of the invention. Amine scrubbing will typically remove the total sulfur down to no more than about 4 vppm and also take out all the $CS_2$, if any (most natural gas does not contain $CS_2$). In the FBSG or other syngas generator or unit, the sulfur compounds remaining in the gas are converted to $H_2S$. Further, since each mole of natural gas makes about three moles of syngas, the sulfur concentration in the syngas product will be about ⅓ that of the natural gas and, as set forth above, contacting the sulfur containing syngas with zinc oxide will reduce the total sulfur to less than 10 vppb and preferably less than 5 vppb.

Figure 2:
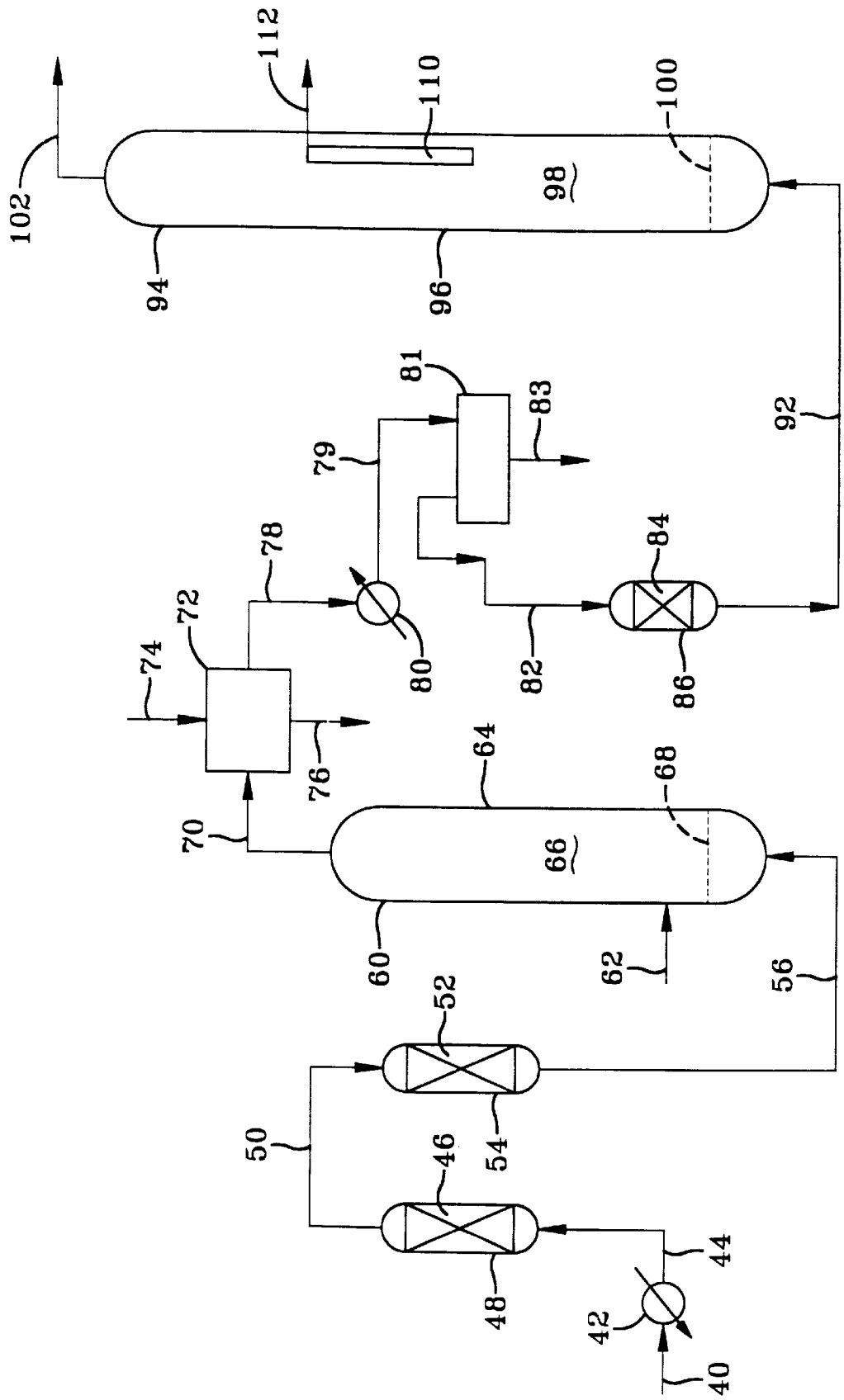
FIG. 2 is a schematic block flow diagram of an integrated syngas and hydrocarbon synthesis process, in which the sulfur content of the natural gas and syngas is reduced according to the invention.

FIG. 1 illustrates in simple block form, a flow diagram of the process of the invention. Thus, the first sulfur compound absorption zone comprises a vessel 10 containing a porous bed 12 comprising particulate zinc oxide and preferably a high surface area zinc oxide. A sulfur containing gas passes from a heat exchanger (not shown) which heats it up to about 350° F. and then passes it through line 18 into bed 12 in vessel 10, in which most of the sulfur is absorbed by contact with the zinc oxide. The sulfur reduced gas is passed, via line 20, into vessel 14 in which it contacts a porous bed 16 comprising particulate, supported nickel metal. This removes more of the sulfur, including most of the COS to produce a gas containing less than 0.1 ppm and preferably less than 80 vppb sulfur which exits via line 22. Finally, while FIG. 1 shows the zinc oxide and nickel beds in separate vessels, and this is a preferred embodiment, if desired they may both be in the same vessel, with the zinc oxide bed upstream of the nickel. Turning now to FIG. 2, a simplified block flow diagram of an integrated syngas and HCS plant is shown. Sulfur (including COS, mercaptans and mostly $H_2S$) containing natural gas comprising at least about 80% $CH_4$ is removed from a gas well and passed through an amine scrubber (not shown) to remove sulfur and $CO_2$ from the gas to reduce the sulfur content of the gas from about 2 volume % down to about 4 ppm, which includes $H_2S$ ranging from about 0.5 to 3 ppm, along with COS and RSH. This gas now comprises about 95% $CH_4$ and is passed via line 40 through a heat exchanger 42 in which the temperature is raised from about 150° F. to about 350° F., to increase the capacity of the zinc oxide and nickel for absorbing sulfur, and passed into a first absorption zone in which it contacts particulate zinc oxide as a porous bed 46 in vessel 48, which adsorbs most of the sulfur and passes out via line 50 into the second sulfur absorption zone in vessel 54. In 54 it contacts a porous bed 52 comprising particles of nickel metal supported on alumina which adsorbs most of the remaining sulfur compounds, to form a sulfur reduced gas having less than 0.1 ppm of sulfur and preferably less than 80 vppb of sulfur. This sulfur reduced gas is passed, via line 56 into an FBSG unit 60. A mixture of oxygen and steam is passed into the fluid bed in the FBSG via line 62. The FBSG unit is a refractory lined reactor having a outer steel shell 64 and contains a fluidized bed comprising a nickel steam reforming catalyst mixed with particulate, inert heat transfer solids (not shown) in the interior 66 of the vessel. An otherwise gas and solids impermeable gas distribution grid briefly illustrated by dashed line 68 in the bottom of the vessel, provides a means for sulfur reduced gas entering the reactor to be injected or otherwise distributed up into the fluid bed of catalyst and also acts, at least as part of the fluidizing gas necessary to maintain the fluid or expanded bed state. The catalyst comprises nickel supported on alpha alumina. In the FBSG reactor, the oxygen or air oxidant partially oxidizes the methane and other hydrocarbons which may be present in the gas. This reaction is very rapid and highly exothermic, and provides the heat required for the much slower endothermic steam reforming reaction. The syngas comprising $H_2$ and CO in a molar ratio of 2.1:1 is passed overhead via line 70 to a water scrubber 72 after passing through primary and secondary cyclones and waste heat recycle equipment (not shown) for removing most of the entrained catalyst fines passing out of the reactor with the syngas. Scrubber 72 removes the rest of the entrained catalyst fines from the syngas and also cools it down to a temperature of about 300° F. Scrubber 72 may be a packed column, a venturi scrubber or combination thereof Water enters the scrubber via line 74 and leaves via line 76 containing water soluble products of the FBSG and catalyst fines which could plug the sulfur absorption units downstream. The cooled gas is then passed, via line 78, into a heat exchanger 80 in which it is further cooled down to a temperature which will typically range from about 200° F. to 350° F. and from there into a separator drum 81 via line 79. The gas is separated from the liquid in the drum and is passed into a sulfur absorption zone via line 82, in which it contacts a gas porous bed of particulate zinc oxide 84 in guard bed vessel 86. The liquid, including catalyst fines, is removed from the drum via line 83 and sent to further processing. The syngas entering bed 84 has a sulfur content typically ranging from about 10–100 ppb and preferably no more than 50 ppb, which is all $H_2S$. In 86, the sulfur content of the gas is reduced to below 10 vppb and preferably below 5 vppb. The syngas exiting bed 86 is passed via line 92 up into the bottom of a slurry HCS reactor 94 comprising outer shell 96 containing a slurry 98 (not shown) within. The gas enters the bottom of the reactor and passes through a liquid and otherwise gas impermeable gas distributor grid, simply and briefly illustrated by dashed line 100, from which it is injected up into the slurry in the reactor. The slurry comprises a hydrocarbon slurry liquid containing a solid, particulate hydrocarbon synthesis catalyst and bubbles of syngas and gas products of the HCS reaction. In the slurry, the syngas reacts in the presence of the catalyst to form hydrocarbons, at least a portion of which are liquid at the reaction conditions and which comprise the slurry liquid. The liquid hydrocarbon products are removed from within the HCS reactor via suitable separation means, preferably filtration means briefly illustrated as 110 in which the liquid is separated from the solids and gas as filtrate which is removed from the filter and reactor via line 112. Gas products of the hydrocarbon synthesis reaction and unreacted syngas are removed from the reactor as overhead via line 102. At least a portion of the hydrocarbon liquid removed from the HCS reactor is sent to one or more downstream conversion operations in which it is converted to more valuable product. While this embodiment has been shown for a slurry HCS process, the invention is not intended to be so limited.

In an HCS process, liquid and gaseous hydrocarbon products are formed by contacting a syngas comprising a mixture of $H_2$ and CO with a suitable Fischer-Tropsch type HCS catalyst, under shifting or non-shifting conditions and preferably non-shifting conditions in which little or no water gas shift reaction occurs, particularly when the catalytic metal comprises Co, Ru or mixture thereof Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

In a Fischer-Tropsch slurry HCS process, a syngas comprising a mixture of $H_2$ and CO is bubbled up into a reactive slurry in which it is catalytically converted into hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. The stoichiometric mole ratio for a Fischer-Tropsch HCS reaction is 2.0, but there are many reasons for using other than a stoichiometric ratio as those skilled in the art know and a discussion of which is beyond the scope of the present invention. In a slurry HCS process the mole ratio of the $H_2$ to CO is typically about 2.1/1. The slurry liquid in the reactor comprises the hydrocarbon products of the hydrocarbon synthesis reaction which are liquid at the reaction conditions. While the temperature and pressure in the slurry can vary widely depending on the particular catalyst used and products desired, typical conditions effective to form hydrocarbons comprising mostly $C_{5+}$ paraffins, (e.g., $C_{5+}$–$C_{200}$) and preferably $C_{10+}$ paraffins, in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. The slurry typically contains from about 10 wt. % to 70 wt. % catalyst solids and as mentioned above, the slurry liquid comprises hydrocarbon products which are liquid at the reaction conditions, along with minor amounts of other components.

The hydrocarbons produced by an HCS process according to the invention are typically upgraded to suitable products, by subjecting all or a portion to fractionation and/or conversion. By conversion is meant one or more operations in which the molecular structure of at least a portion of the hydrocarbon is changed and includes both noncatalytic processing (e.g., steam cracking), and catalytic processing in which a fraction is contacted with a suitable catalyst, with or without the presence of hydrogen or other coreactants. If hydrogen is present as a reactant, such process steps are typically referred to as hydroconversion and include, for example, hydroisomerization, hydrocracking, hydrodewaxing, hydrorefining and the more severe hydrorefining referred to as hydrotreating. Illustrative, but nonlimiting examples of suitable products formed by upgrading include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

The invention will be further understood with reference to the examples below.

EXAMPLES

Example 1

This experiment was conducted with a pilot plant FBSG syngas unit operating at about 345 psia and 1750° F. in which the steam reforming catalyst was 1 wt. % nickel on a particulate alpha alumina support. In all of the runs, a single guard bed containing both zinc oxide and nickel was used in various configurations or arrangements of the two adsorbents. The fluidized bed in the unit was a mixture of catalyst and inert solids for more efficient heat transfer, with more inert solids present than catalyst. The alkane feed was a cryogenically refined natural gas comprising 98% $CH_4$, with the remainder being mostly $CO_2$ and ethane, and which also contained about 4 ppm of sulfur in sulfur containing compounds including $H_2S$, COS and RSH and other organic sulfur compounds. The $H_2S$ content of the refined natural gas varied from about 0.5 to 3 ppm during the runs. A low temperature, high porosity zinc oxide was used which had a surface area ranging between about 75–95 $m^2/g$ and the nickel adsorbent comprised 40–50 wt. % nickel metal on an alumina extrudate, with a minimum surface area of the nickel being 30 $m^2/g$. The effectiveness of the sulfur absorption was evaluated by measuring the methane content of the exiting syngas, which is a function of the methane conversion in the unit and concomitantly the supported nickel steam reforming catalyst activity in the fluid bed of the FBSG. When the zinc oxide and nickel were mixed together in the same bed and when the nickel was placed upstream of the zinc oxide, the reforming catalyst activity varied widely and required frequent additions of fresh catalyst to bring the methane conversion back up. Only with the zinc oxide upstream of the supported nickel did the activity remain fairly constant, indicating greater sulfur removal from the feed gas.

Example 2

This experiment was similar to that above and was intended to measure the sulfur content, including the $H_2S$ content, of the refined natural gas as it passed through the guard beds and also that of the syngas exiting the FBSG. The guard bed configuration was that illustrated in FIG. 1 and the catalysts and gas, etc. were the same as in the example above. Both a gas chromatograph and a Houston Atlas analyzer with the pyrolyzer both on and off were used to monitor and measure the total sulfur and $H_2S$ contents of the gas at various points in the flow scheme shown in FIG. 2. This unit converts all sulfur compounds to $H_2S$ to make the measurements. These results indicated that the gas exiting the two guard beds and entering the FBSG had a sulfur content ranging from about 50–150 ppb, which included less than 5 ppb of $H_2S$. The syngas exiting the FBSG had a total sulfur content ranging from about 10–50 ppb, which included less than 5 ppb, all of which was $H_2S$.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for producing a synthesis gas comprising a mixture of $H_2$ and CO from a sulfur containing gas feed comprising alkane hydrocarbons wherein said sulfur includes $H_2S$ and COS, which comprises contacting said feed first with zinc oxide to absorb a portion of said sulfur from said gas to form a first sulfur reduced gas, followed by contacting said first sulfur reduced gas with nickel to form a sulfur reduced gas containing less than 0.1 ppm of sulfur which is passed into a synthesis gas generating unit in which it is partially oxidized and catalytically steam reformed in the presence of a reforming catalyst to form said synthesis gas.

2. A process according to claim 1 wherein said syngas is contacted with zinc oxide to form a synthesis gas containing less than 10 vppb of sulfur.

3. A process according to claim 2 wherein said alkane comprises a $C_1$–$C_4$ alkane.

4. A process according to claim 3 wherein said gas feed comprises natural gas.

5. A process according to claim 4 wherein said gas feed contains mercaptans.

6. A process according to claim 5 wherein said synthesis gas contains less than 5 vppb of sulfur after being contacted with said zinc oxide.

7. A process for forming hydrocarbons from a synthesis gas feed comprising a mixture of $H_2$ and CO, said process comprising:
   (a) contacting a sulfur containing gas comprising methane first with zinc oxide and then nickel to form a sulfur reduced gas containing less than 0.1 ppm of total sulfur;
   (b) partially oxidizing and catalytically steam reforming said sulfur reduced gas in a synthesis gas reaction zone to form a synthesis gas comprising a mixture of $H_2$ and CO;
   (c) contacting said synthesis gas with zinc oxide to form a synthesis gas feed having less than 10 vppb of sulfur, and
   (d) reacting said $H_2$ and CO in said synthesis gas feed formed in step (c) in a hydrocarbon synthesis reaction zone in the presence of a hydrocarbon synthesis catalyst at reaction conditions effective to form hydrocarbons.

8. A process according to claim 7 wherein said sulfur in said containing gas comprises $H_2S$ and COS.

9. A process according to claim 8 wherein at least a portion of said hydrocarbons are upgraded into at least one more valuable product by at least one conversion operation.

10. A process according to claim 9 wherein said sulfur containing gas comprises natural gas.

11. A process according to claim 10 wherein said sulfur containing gas contains mercaptans.

12. A process according to claim 9 wherein said synthesis gas reaction zone comprises a fluid bed synthesis gas reaction zone.

13. A process according to claim 11 wherein said hydrocarbon synthesis reaction zone is a slurry reaction zone and wherein a portion of said hydrocarbons formed in said zone are liquid at said reaction conditions.

14. A process according to claim 12 wherein said hydrocarbon synthesis reaction zone is a slurry reaction zone and wherein a portion of said hydrocarbons formed in said zone are liquid at said reaction conditions.

15. The process of claim 13 wherein a portion of the liquid hydrocarbons is subjected to fractionation.

16. The process of claim 13 wherein a portion of the liquid hydrocarbons is subjected to conversion.

17. The process of claim 16 wherein the conversion is non-catalytic.

18. The process of claim 17 wherein the non-catalytic conversion is steam cracking.

19. The process of claim 16 wherein the conversion is catalytic.

20. The process of claim 19 wherein the catalytic conversion is in the presence of hydrogen.

21. The process of claim 20 wherein the catalytic conversion is hydroisomerization.

22. The process of claim 21 wherein a product of the conversion is a diesel fuel.

* * * * *